United States Patent
Shau et al.

(10) Patent No.: US 9,666,055 B2
(45) Date of Patent: May 30, 2017

(54) DISTRESS SIGNAL TRANSMITTERS

(71) Applicants: David Yen Shau, Palo Alto, CA (US); Jeng-Jye Shau, Palo Alto, CA (US)

(72) Inventors: David Yen Shau, Palo Alto, CA (US); Jeng-Jye Shau, Palo Alto, CA (US)

(*) Notice: Subject to any disclaimer, the term of this patent is extended or adjusted under 35 U.S.C. 154(b) by 0 days.

(21) Appl. No.: 14/840,027

(22) Filed: Aug. 30, 2015

(65) Prior Publication Data
US 2017/0069195 A1    Mar. 9, 2017

(51) Int. Cl.
*G08B 23/00* (2006.01)
*G08B 21/08* (2006.01)

(52) U.S. Cl.
CPC ................... *G08B 21/088* (2013.01)

(58) Field of Classification Search
CPC .................................................. G08B 21/088
USPC ........................................................ 340/573.6
See application file for complete search history.

(56) References Cited

U.S. PATENT DOCUMENTS

| | | | |
|---|---|---|---|
| 5,326,297 A | 7/1994 | Loughlin | |
| 5,886,635 A * | 3/1999 | Landa | G08B 21/088 340/539.1 |
| 8,624,726 B2 | 1/2014 | Rastegar | |
| 8,998,666 B1 * | 4/2015 | Albright | B63C 9/00 340/539.13 |
| 2009/0251280 A1 * | 10/2009 | Marchetto | G08C 17/02 340/5.7 |
| 2009/0278358 A1 * | 11/2009 | Lemieux | F03B 13/20 290/53 |
| 2011/0128147 A1 * | 6/2011 | Pan | G08B 21/22 340/539.13 |

* cited by examiner

*Primary Examiner* — Kerri McNally

(57) ABSTRACT

Distress signal transmitters of the present invention are designed to maximize the chance for a victim to survive an accident, and minimize the time for a rescue party to find a victim. The preferred embodiments of the distress signal transmitters of the present invention are to be self-powered, self-activated, and to remain fully functional when dropped into salt water. This will allow the Radio Frequency (RF) distress signals to be sent over a long distance, even if the user is unconscious or severely injured. Furthermore, a set of coordinates determined by a Global Positioning System will be transmitted with the S.O.S message in order for search parties to quickly and efficiently pinpoint the location of the victim(s).

20 Claims, 5 Drawing Sheets

DISTRESS SIGNAL TRANSMITTERS

BACKGROUND OF THE INVENTION

The present invention relates to distress signal transmitters that are attachable to life jackets or articles of clothing.

On Jul. 24, 2015, two teenagers and their fishing boat went missing off the coast of southern Florida. In response to this news, the local Florida coast guards searched the corresponding area to try to locate and rescue them. After a few days, the coast guards finally discovered their capsized fishing boat, but still could not locate the boys. Eventually, the coast guards called off the search, leaving the parents to continue with their own private search that was funded by friendly donations. Unfortunately, the boys were never found, and the parents eventually gave up after losing hope. This tragedy was caused by the difficulty in locating the individuals that were lost at sea. It is therefore highly desirable to create devices that can transmit S.O.S distress signals to allow search parties to quickly find the victims.

If the two boys were able to call the coast guards as soon as their boat capsized, their lives may have been saved. However, the accident happened at a location far from any cell tower. Common cellular phones are not useful in such situations because common cellular phone signals can not reach that long of a distance. Kuo in CN Patent No. 201690506 disclosed a mobile phone with the ability to send an emergency call using FM radio waves. It is adapted to situations in which the user is in distress, and when the user's mobile phone is unable to connect to a cell tower. However, if the user is unconscious or physically unable to use the mobile phone, then Kuo's mobile phone will not be of use. In addition, transmission of FM waves would require the use of an antenna, and therefore would not function if the mobile phone was dropped into water while the boat was capsized.

Rastegar in U.S. Pat. No. 8,624,726 disclosed a battery-less hand-held device that transmits a distress signal. The device generates electricity when it is impacted against another surface, and therefore does not require a pre-charged battery in order to generate the signal. However, Rastegar's device requires the user to impact the device against another surface, and therefore can not be of use if the user is lost at sea, or is physically unable to activate the device. Rastegar's device also would not function if it were dropped into sea water.

Loughlin in U.S. Pat. No. 5,326,297 disclosed a multi-purpose life jacket that includes a signal device. The signal device is triggered upon contact with water, and includes a transmitter, a speaker, and a battery. Therefore, Loughlin's device is adapted to situations where a person is thrown overboard, and is physically unable to manually activate the device. However, Loughlin's device requires the use of an electrical battery that is not self-powered, and will constantly lose power. As a result, when the battery is completely out of power, the signal device will be disabled. It is furthermore a maintenance burden to keep all batteries charged at all times. In addition, the signal device requires an antenna in order to transmit the signal. Because antennas are not functional when submerged in water, this device would not function well at sea. Furthermore, Loughlin's device does not include a method of canceling the distress signaling, allowing the possibility for false signals to be sent on accident.

It is therefore desirable to provide distress signal transmitters that can be automatically activated upon contact with water in order to ensure the transmission of the distress signal even if a person is unconscious or severely injured. It should also include a self-powered battery in order to ensure that the device will not run out of electricity. The antenna of the device should be able to float above the surface of water. In addition, the device should include a method to cancel the distress signal in case of an accidental activation. It is also highly desirable to provide coordinates determined by a Global Positioning System (G.P.S) so that search parties can pinpoint the location of the victim.

SUMMARY OF THE PREFERRED EMBODIMENTS

A primary objective of the preferred embodiments is, therefore, to provide self-powered, self-activated S.O.S signal transmitters that allow the users to send radio frequency (RF) distress signals over a long distance even if the users are unconscious or severely injured. Another primary objective of the preferred embodiments is to provide S.O.S signal transmitters that can be fully functional while they are dropped into sea water. An objective of the preferred embodiments is to provide coordinates determined by a Global Positioning System (G.P.S) so that the search parties can pinpoint the location of the victim. Another objective of the preferred embodiments is to provide a method to cancel the distress signal in case of an accidental activation.

While the novel features of the invention are set forth with particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
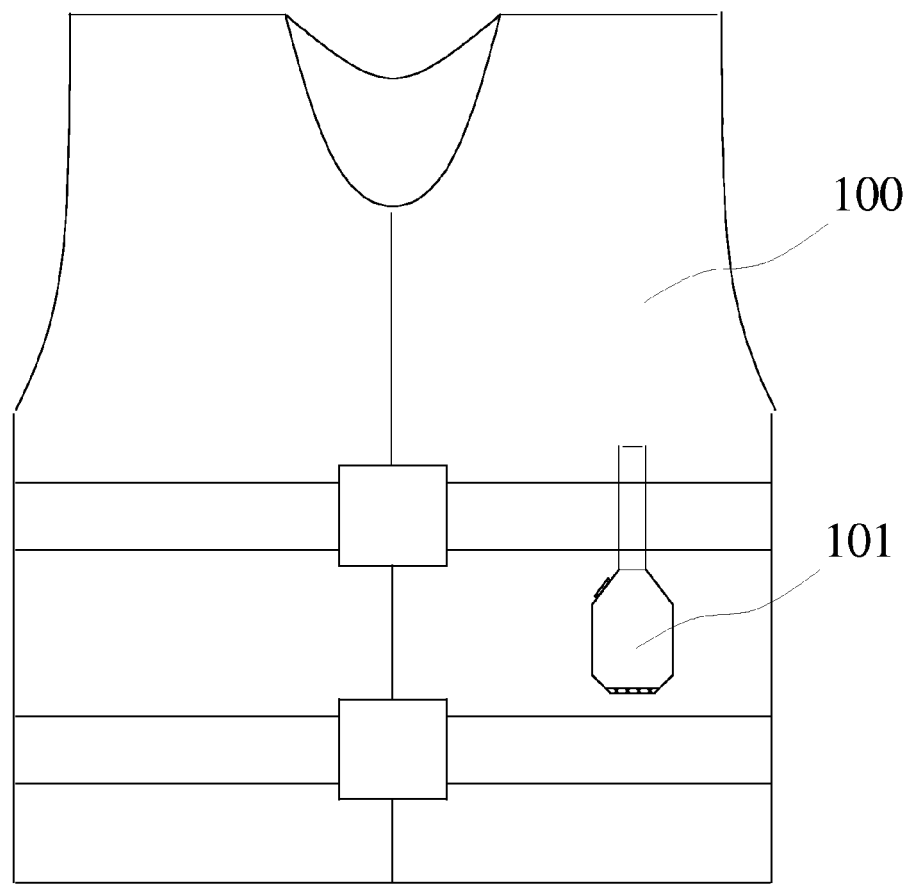
FIG. 1 shows a life jacket (100) equipped with one example of the distress signal transmitter of the present invention (101)

A distress signal transmitter of the present invention (101) typically can be attached to a life jacket (100) or other articles of clothing, as illustrated in FIG. 1.

Figure 2A:
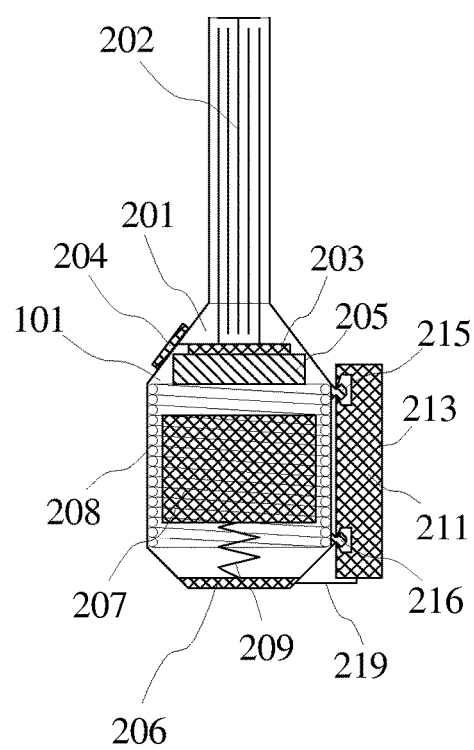
FIG. 2(a) illustrates exemplary structures of the distress signal transmitter (101) in FIG. 1.

FIG. 2(a) illustrates the structure of one example of the preferred embodiments of the present invention that is in standby position. This device (101) comprises a buoy (201) and a clip (211). The buoy (201) is attached to the clip (211) through two detachable connecters (215, 216) that are inserted into the clip (211). The buoy (201) is also connected to the clip (211) through a string (219) where most of the string (219) is stored in a chamber (213) inside the clip (211). The clip (211) allows the device (101) to be attached to the life jacket (100).

Figure 2B:
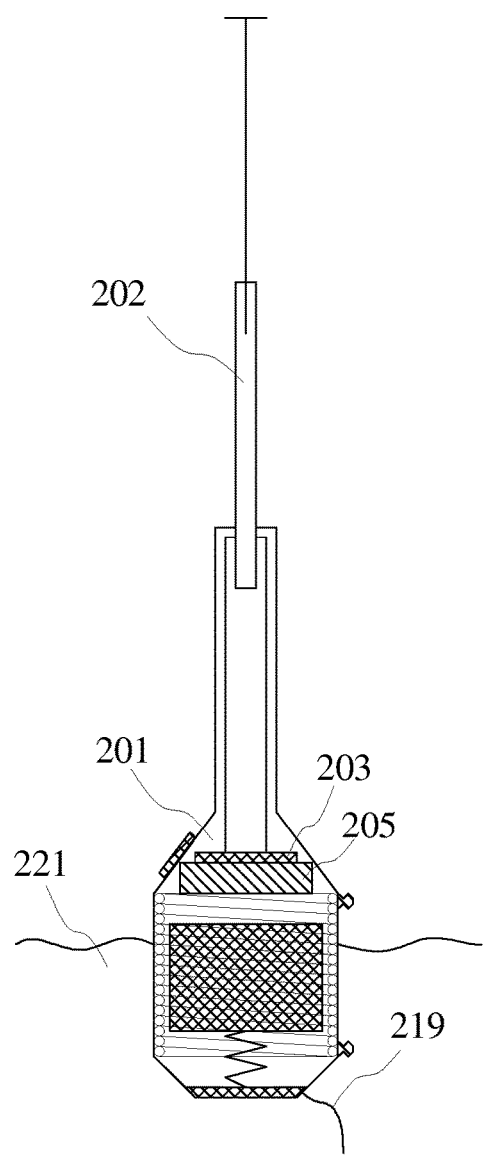
FIG. 2(b) illustrates the structures of the buoy (201) of the distress signal transmitter (101) in FIG. 2(a) when the buoy (201) is detached from the clip (211)

FIG. 2(*a*) shows the cross-section views of the structures inside the buoy (201). This buoy (201) comprises a magnet (207) that is placed inside an electrical coil (208). This magnet (207) is connected to the bottom of the buoy through a spring (209). When the buoy (201) is in motion due to waves or other reasons, this spring (209) will cause the magnet (207) to vibrate against the electrical coil (208). The relative motion between the magnet (207) and the electrical coil (208) will generate electricity. The electricity generated this way is harvested by electrical circuits controlled by an integrated circuit (203), which charges a battery (205). The integrated circuit (203) also controls the operations of the distress signal transmitter (101). A foldable antenna (202) is placed at the top of the buoy (201) as shown in FIG. 2(*a*). The integrated circuit (203) can use this antenna (202) to transmit distress signals. It can also be used to receive G.P.S signals. A water sensor (206) is placed near the bottom of the buoy (201), and is used to notify the integrated circuit (203) when the buoy (201) is in water. A button switch (204) on the buoy allows the user to manually enable or cancel the actions of the device (101).

Figure 3:
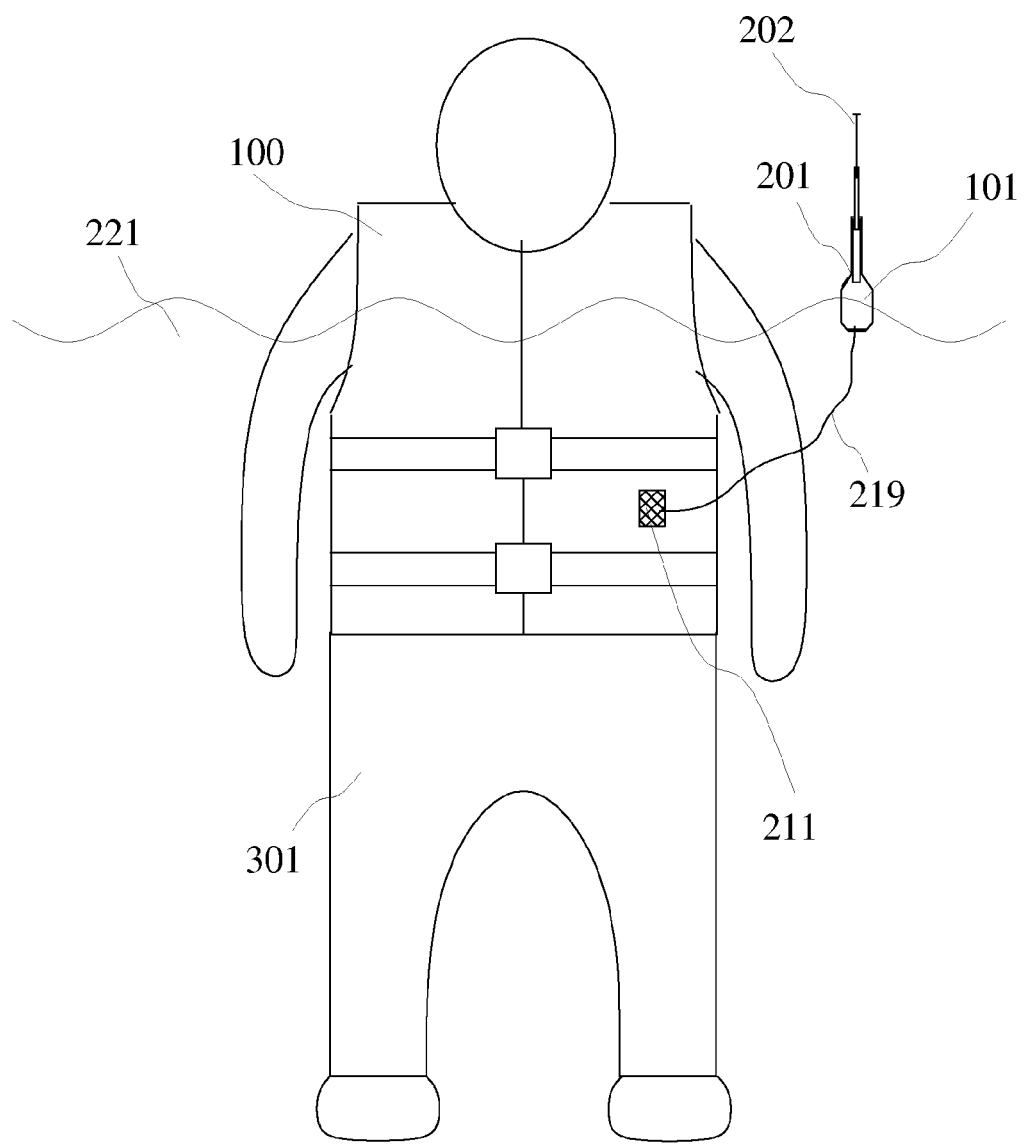
FIG. 3 illustrates a person (301) wearing a life jacket (100) in which the buoy (201) has been detached from its clip (211).

FIG. 3 illustrates a situation when a person (301) is in water (221), and is wearing a life jacket (100) with an attached distress signal transmitter (101). When submerged in water, the buoyant force on the buoy (201) detaches the two detachable connecters (215, 216) from the clip (211) so that the buoy (201) can be separated from the clip (211). FIG. 2(*b*) illustrates one example of the preferred embodiments of the present invention when the buoy (201) is detached from the clip and is floating in water (221). The structure of the device is similar to that of FIG. 2(*a*), except that the antenna (202) is now fully extended. The buoy (201) would be floating on the surface of the water (221) as shown in FIG. 3. In this way, the antenna (202) can stay above the surface of the water to emit clear distress signals. The buoy (201) is still connected to the clip (211) through a string (219) so that it will not drift too far away from the person (301).

An S.O.S distress signal is then sent when the buoy (201) is detached from the clip (211). The distress signal also includes the location of the device determined by a G.P.S so that rescue parties will be able to pinpoint where the signal is coming from. The distress signal also can include an identification (ID) code which can help the rescue party know how many people are in danger.

In addition, the device in this example also comprises a water sensor (206) that detects water. This water sensor (206) provides a way for the transmitter (101) to differentiate whether a person is truly in distress, or whether the signal was sent by accident. If the signal were to be sent by accident, the transmitter (101) can send a cancel signal to notify that the distress signal was sent on accident. The cancel signal also can be activated manually by pressing the electrical button (204) on the device.

While the preferred embodiments have been illustrated and described herein, other modifications and changes will be evident to those skilled in the art. For example, instead of using a foldable antenna, a fixed antenna also can be used. The antenna does not have to be placed inside a buoy, it also can be placed in other floatable container such as a position near the top of a life jacket. The control circuits, battery, and power generator do not need to be placed inside of the buoy, parts of them or all of them can be placed inside the clip. The distress signal transmitter (101) does not have to be attached to a life jacket, it can be attached to other clothing, and it can also be part of a life jacket. It is to be understood that there are many other possible modifications and implementations so that the scope of the invention is not limited by the specific embodiments discussed herein.

Figure 4A:
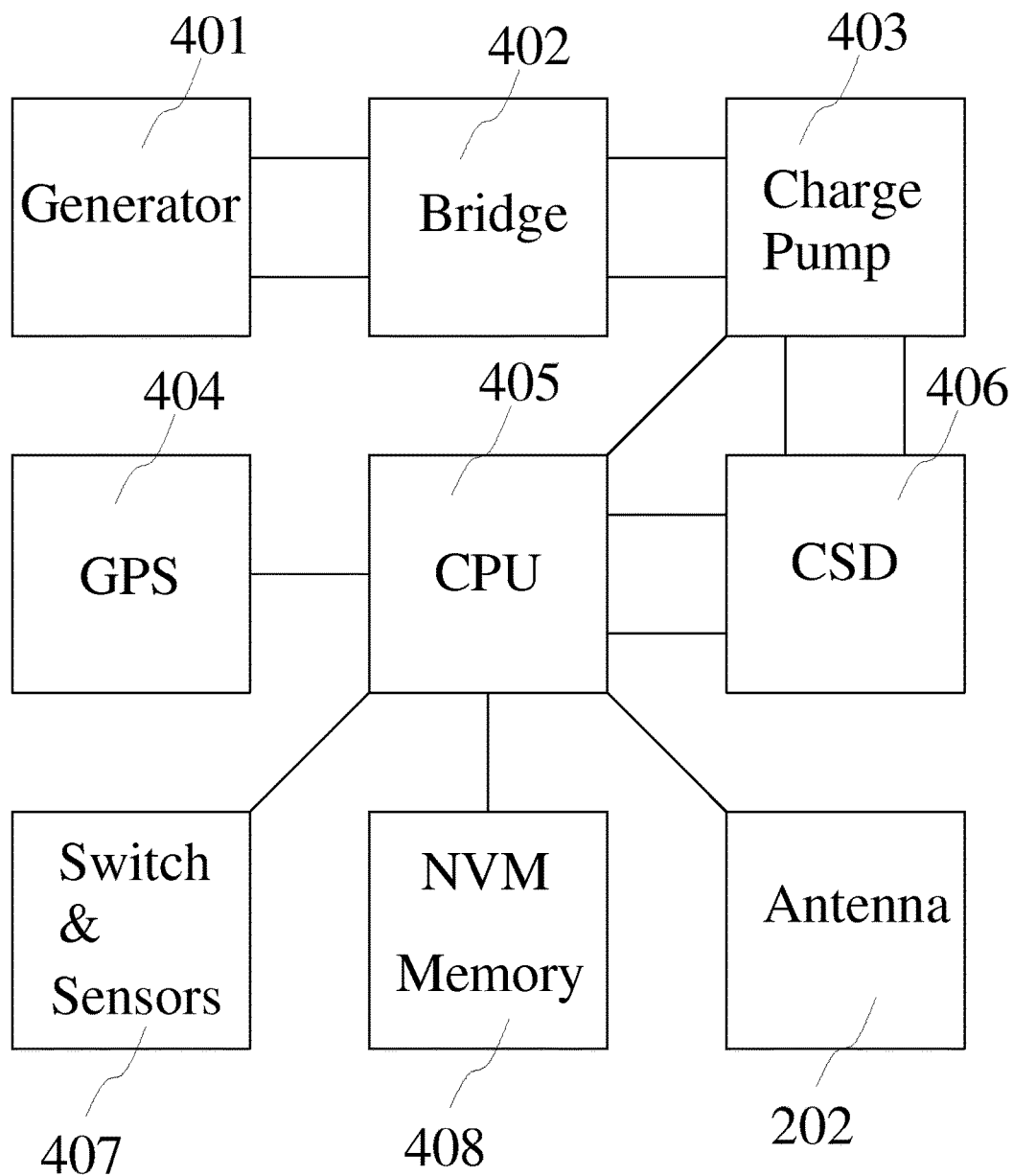
FIG. 4(a) is a simplified symbolic block diagram for one example of the electrical circuits used by the distress signal transmitter (101)
Figure 4B:
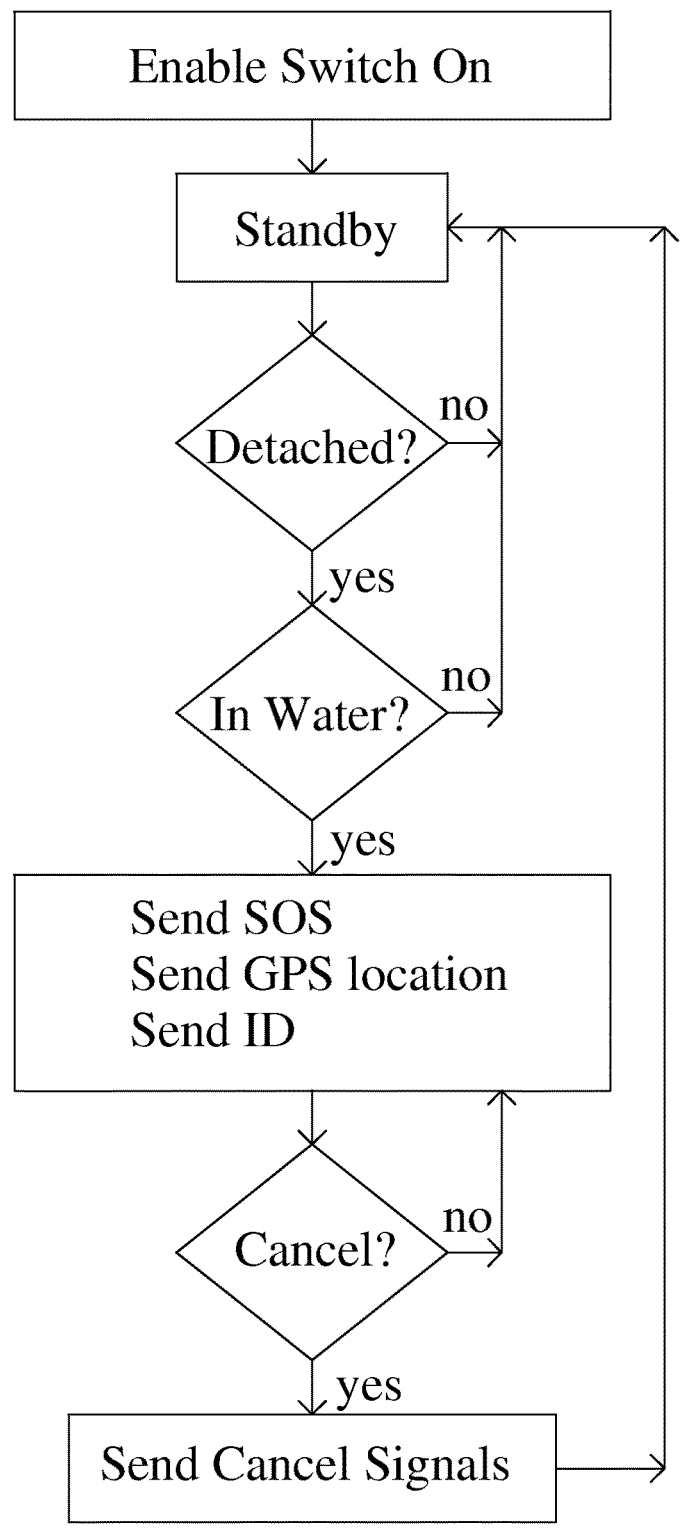
FIG. 4(b) is a flow chart for one example of the control logic of the distress signal transmitter (101).

FIG. 4(*a*) is a simplified symbolic block diagram of one example of the electrical circuits used in a distress signal transmitter of the present invention. An electrical power generator (401) that comprises a magnet and an electrical coil converts motion into electrical energy. Other types of electrical power generators, such as solar cells, also can be used for the same purpose. The electrical current generated by this electrical power generator (401) is rectified by a diode bridge (402) and is stored into a capacitor. A charge pump circuit (403) converts the voltage on the diode bridge (402) into proper voltages that can be used to charge a charge storage device (406). A charge storage device (CSD) can be a battery or a capacitor. A central processing unit (CPU) (405) controls the charge pump circuit (403) for this electrical energy harvesting processes. The software that controls this CPU (405) is stored in a nonvolatile memory (NVM) device (408). The CPU may also need other types of memory devices to support its operations. The nonvolatile memory device also can be used to store an identification (ID) code. The CPU also can be used to process G.P.S (404) signals to determine the location of this device. Other electrical components (407) such as sensors and switches are monitored by the CPU (405). Based on the information received from those components, the CPU (405) can determine to send out stress signals through an antenna (202).

FIG. 4(*b*) shows a flow chart for one example of the logic used to control a distress signal transmitter of the present invention. When the enable switch (204) is turned on, the device is placed into a standby mode. At standby mode, the CPU should control the power generating circuits to keep the charge storage device (CSD) fully charged while monitoring the status of sensors. If the sensors indicates that the buoy (201) has been detached from the clip (211), and that the water sensor (206) has detected water, then the CPU starts to send S.O.S signals through the antenna (202), along with the coordinates determined by G.P.S, and the ID codes, as illustrated by the flow chart in FIG. 4(*b*). At this distress mode, the CPU should monitor the status of sensors to determine if the distress condition was a false alarm or not. For example, if the water sensor no longer detects water, what happened may be a false alarm. A user also can push the enable button (204) when it is found to be a false alarm. When it is found to be a false alarm, the device should send cancel signals through the antenna (202) to notify rescue parties, and go back to standby mode. Otherwise, the device should continue to send out pulses of distress signals, as shown by the flow chart in FIG. 4(*b*).

While the preferred embodiments have been illustrated and described herein, other modifications and changes will be evident to those skilled in the art. For example, instead of using a CPU, we can use logic circuits to control operations. Instead of a water sensor, other sensors such as heart beat sensors also can be used to make decisions. It is typically desirable to provide an interface to update the software stored in the nonvolatile memory device. We also can add audio devices such as microphones and speakers to the device so that voice communication also can be sent through the RF antenna. The electrical power generator does not have to be a magnet and a coil, other types of electrical power generators, such as solar cells, also can be used for this purpose. It is to be understood that there are many other possible modifications and implementations so that the scope of the invention is not limited by the specific embodiments discussed herein.

Distress signal transmitters of the present invention are designed to maximize the chance for a victim to survive an accident, and minimize the time for a rescue party to find a victim. A distress signal transmitter of the present invention typically comprises a clip or other types of structures used to attach the device to a lifejacket or an article of clothing, a radio frequency (RF) antenna for emitting radio frequency electromagnetic signals, electrical control circuits for controlling the operation of the distress signal transmitter, an electrical charge storage device for providing the electrical power to support electrical components, and an electrical power generator for generating electrical energy to be stored in the electrical charge storage device. It is highly desirable for the electrical power generator to able to generate electrical energy automatically without the needs of conscious human operations. It is also highly desirable to place the RF antenna in a container that can float on water while part of the distress signal transmitter is submerged under water. One example of the electrical power generator for the distress signal transmitter comprises a magnet and an electrical coil, and generates electrical power while the magnet moves relative to the electrical coil. It is desirable that the electrical circuits are able to determine the condition to start emitting distress signals without the needs of conscious human activation. For our example, the location of the device determined by a global positioning system (G.P.S) and an ID code are sent along with the S.O.S signals. The ID code can be stored in a nonvolatile memory device that also can be used to store control software. After distress signals are transmitted, the distress signal transmitter may detect that it was caused by false alarm, and will send out canceling signals.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. A distress signal transmitter comprising:
    a radio frequency (RF) antenna for emitting radio frequency signals,
    electrical control circuits for controlling the operations of said distress signal transmitter,
    battery for providing the electrical power to support said distress signal transmitter, and
    an electrical power generator for generating electrical energy to be stored into said battery; wherein part of or all of said electrical power generator is placed in a container that can float on water while part of the distress signal transmitter is submerged under water, and that said electrical power generator is able to generate electrical energy using water wave energy without the needs for conscious human operations, and that the output of said electrical power generator is coupled to an electrical circuit that converts the output voltage of the floatable electrical power generator into proper voltages that can be used to charge the battery, so that said floatable electrical power generator is able to charge the battery when the distress signal transmitter is outside of or in water.

2. The electrical power generator for the distress signal transmitter in claim 1 comprises a magnet and an electrical coil.

3. The electrical power generator in claim 2 generates electrical power while the magnet moves relative to the electrical coil.

4. The distress signal transmitter in claim 1 further comprises electrical circuits for determining the condition to start emitting distress signals without the needs of conscious human activation.

5. The distress signal transmitter in claim 1 further comprises electrical circuits for determining the location of the device using a global positioning system (G.P.S).

6. The distress signal transmitter in claim 1 further comprises electrical circuits to report the location of the device through the emitted distress signals.

7. The distress signal transmitter in claim 1 further comprises nonvolatile memory device that stores an identification code.

8. The distress signal transmitter in claim 1 further comprises electrical circuits to report an identification code through the emitted distress signals.

9. The distress signal transmitter in claim 1 further comprises electrical circuits for sending out cancelling signals when previous stress signals were sent by false alarm.

10. The distress signal transmitter in claim 1 further comprises a water sensor.

11. The distress signal transmitter in claim 1, wherein the RF antenna of the distress signal transmitter is placed in a container that can float on water while part of the distress signal transmitter is submerged under water.

12. The distress signal transmitter in claim 11 further comprises an electrical power generator that generates electrical power to support the operations of the distress signal transmitter.

13. The electrical power generator in claim 12 is able to generate electrical energy automatically without the needs of conscious human operations.

14. The distress signal transmitter in claim 11 further comprises electrical circuits for determining the condition to start emitting distress signals without the needs of conscious human activation.

15. The distress signal transmitter in claim 11 further comprises electrical circuits for determining the location of the device using a global positioning system (G.P.S).

16. The distress signal transmitter in claim 11 further comprises electrical circuits to report the location of the device through the emitted distress signals.

17. The distress signal transmitter in claim 11 further comprises a nonvolatile memory device that stores an identification code.

18. The distress signal transmitter in claim 11 further comprises electrical circuits to report an identification code through the emitted distress signals.

19. The distress signal transmitter in claim 11 further comprises electrical circuits for sending out cancelling signals when previous stress signals were sent by false alarm.

20. The distress signal transmitter in claim 11 further comprises a water sensor.

* * * * *